(12) United States Patent
Pironneau et al.

(10) Patent No.: US 10,704,195 B2
(45) Date of Patent: Jul. 7, 2020

(54) MULTI-STRAND CABLE OF 1×N STRUCTURE FOR PROTECTIVE REINFORCEMENT OF A TIRE

(71) Applicant: COMPAGNIE GENERALE DES ETABLISSEMENTS MICHELIN, Clermont-Ferrand (FR)

(72) Inventors: Natacha Pironneau, Clermont-Ferrand (FR); Emmanuel Clement, Clermont-Ferrand (FR); Thibault Rapenne, Clermont-Ferrand (FR); Eric Colin, Clermont-Ferrand (FR); Pascal Chavarot, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 443 days.

(21) Appl. No.: 15/546,468

(22) PCT Filed: Feb. 17, 2016

(86) PCT No.: PCT/EP2016/053347
§ 371 (c)(1),
(2) Date: Jul. 26, 2017

(87) PCT Pub. No.: WO2016/131862
PCT Pub. Date: Aug. 25, 2016

(65) Prior Publication Data
US 2018/0010294 A1   Jan. 11, 2018

(30) Foreign Application Priority Data
Feb. 19, 2015   (FR) ...................................... 15 51378

(51) Int. Cl.
*D07B 1/06*   (2006.01)
*D07B 5/12*   (2006.01)
*B60C 9/20*   (2006.01)

(52) U.S. Cl.
CPC .......... *D07B 1/0613* (2013.01); *B60C 9/2006* (2013.01); *D07B 1/0626* (2013.01);
(Continued)

(58) Field of Classification Search
CPC .. D07B 1/0613; D07B 1/0626; D07B 1/0633; D07B 5/12; B60C 9/2006
See application file for complete search history.

(56) References Cited

U.S. PATENT DOCUMENTS

| | | | | |
|---|---|---|---|---|
| 5,687,557 A * | 11/1997 | De Vos | .................. | B60C 9/0007 57/214 |
| 6,311,466 B1 * | 11/2001 | De Vos | ................ | D07B 1/0646 57/212 |
| 7,228,681 B2 * | 6/2007 | Meersschaut | ........ | D07B 1/0646 57/213 |
| 8,166,741 B2 * | 5/2012 | Barguet | ................... | D02G 3/48 57/216 |

(Continued)

FOREIGN PATENT DOCUMENTS

| | | | |
|---|---|---|---|
| EP | 0 383 716 A1 | | 8/1990 |
| EP | 0 602 733 A1 | | 6/1994 |

(Continued)

OTHER PUBLICATIONS

Apr. 22, 2016 International Search Report and Written Opinion in International Patent Appln. No. PCT/EP2016/053347.
(Continued)

*Primary Examiner* — Shaun R Hurley
(74) *Attorney, Agent, or Firm* — Venable LLP

(57) ABSTRACT

A method is provided for manufacturing a multistrand cable having a 1×N structure and including a single layer of N
(Continued)

strands wound in a helix. Each strand includes an internal layer of M internal threads and an external layer of P external threads. The method includes a step of individually assembling each of the N strands, during which, in chronological order, the M internal threads are wound, the P external threads are wound, and the M internal threads and the P external threads are elongated such that a structural elongation associated with the P external threads of each strand is greater than or equal to 0.05%. The method further includes a step of collectively assembling the N strands, during which the N strands are wound to form the cable.

29 Claims, 4 Drawing Sheets

(52) U.S. Cl.
CPC ............ *D07B 1/0633* (2013.01); *D07B 5/12* (2013.01); *B60C 2009/2077* (2013.01); *B60C 2200/065* (2013.01); *D07B 2201/1032* (2013.01); *D07B 2201/1052* (2013.01); *D07B 2201/1068* (2013.01); *D07B 2201/2029* (2013.01); *D07B 2201/2032* (2013.01); *D07B 2201/2061* (2013.01); *D07B 2207/4072* (2013.01); *D07B 2401/201* (2013.01); *D07B 2401/208* (2013.01); *D07B 2401/2015* (2013.01); *D07B 2501/2046* (2013.01)

(56) References Cited

U.S. PATENT DOCUMENTS

| | | | |
|---|---|---|---|
| 8,857,146 B2 * | 10/2014 | Gauthier | D07B 1/0613 57/223 |
| 9,267,233 B2 * | 2/2016 | Barguet | D07B 1/0613 |
| 2012/0159919 A1 | 6/2012 | Gauthier et al. | 57/212 |
| 2015/0122394 A1 | 5/2015 | Huyghe et al. | B60C 15/04 |
| 2015/0136295 A1 | 5/2015 | Barguet et al. | B60C 9/0007 |
| 2015/0144245 A1 | 5/2015 | Bucher et al. | B60C 15/04 |
| 2015/0159325 A1 | 6/2015 | Barguet et al. | D07B 5/12 |
| 2015/0174968 A1 | 6/2015 | Huyghe et al. | B60C 15/04 |
| 2015/0329995 A1 | 11/2015 | Clement et al. | D02G 3/38 |
| 2017/0182846 A1 | 6/2017 | Clement et al. | B60C 9/2006 |
| 2017/0203613 A1 | 7/2017 | Domingo et al. | B60C 9/20 |

FOREIGN PATENT DOCUMENTS

| | | |
|---|---|---|
| EP | 2 433 814 A1 | 3/2012 |
| JP | S58-41638 A | 3/1983 |
| JP | H06-200491 A | 7/1994 |
| JP | H07-292585 A | 11/1995 |
| JP | WO 2013/107570 A1 | 7/2013 |
| WO | WO 2011/134900 A1 | 11/2011 |

OTHER PUBLICATIONS

International Search Report issued by WIPO dated Apr. 22, 2016, in connection with International Application No. PCT/EP2016/053347 (with English translation attached).

* cited by examiner

MULTI-STRAND CABLE OF 1×N STRUCTURE FOR PROTECTIVE REINFORCEMENT OF A TIRE

FIELD OF THE INVENTION

The invention relates to a method for manufacturing a multistrand cable, to a multistrand cable that is able to be obtained by this method, and to a tire comprising this cable.

RELATED ART

A tire for a civil engineering vehicle, having a radial carcass reinforcement comprising a tread, two inextensible beads, two sidewalls connecting the beads to the tread and a crown reinforcement, disposed circumferentially between the carcass reinforcement and the tread, is known from the prior art. This crown reinforcement comprises several rubber plies, possibly reinforced with reinforcing elements such as metal cables.

The crown reinforcement comprises a working reinforcement, a protective reinforcement and possibly further reinforcements, for example a hoop reinforcement.

The protective reinforcement comprises one or more protective plies comprising several protective reinforcing elements that make an angle of between 15° and 30° with the circumferential direction of the tire. Generally, each protective reinforcing element is a cable comprising several individual metal threads.

The document WO2011/134900 discloses a cable for reinforcing such protective plies. The cable is of the multistrand type and of 1×N structure. The cable comprises a single layer of N=4 strands wound in a helix. Each strand comprises, for the one part, an internal layer of M=4 internal threads wound in a helix and an external layer of P=9 external threads wound in a helix around the internal layer.

The method for manufacturing the cable comprises a first step of individually assembling each of the N strands and a second step of collectively assembling the N strands, during which the N strands are wound in a helix to form the cable. Next, during a subsequent calendering step, several cables are covered simultaneously on either side with two strips of rubber, thereby making it possible to form a protective ply.

However, during the second step of collectively assembling the N strands, it has been found that some of the M internal threads emerge radially between the external threads. This emergence of internal threads happens when there are spaces between the P threads of the external layer, but also when there are no spaces between the P threads of the external layer. Thus, the cable has a variable diameter, the latter being greater at the points at which the internal threads emerge. Such a variation in diameter is problematic notably while the cable passes through the tools for manufacturing the cable, notably during the calendering step. One solution for avoiding such variations in diameter is to isolate the portion of the cable that exhibits the emergence of internal threads, cut it and then join together the two ends that result from the cutting of the cable. However, since external threads emerge at a frequency of around the pitch of the assembly in the collective assembly step (every 15 mm in the case of the cable in WO2011/134900), such a solution is industrially inconceivable.

BRIEF DESCRIPTION OF EMBODIMENTS OF THE INVENTION

The aim of the invention is to make it possible to manufacture a cable that does not have or virtually does not have internal threads emerging radially between the external threads.

To this end, the subject of the invention is a method for manufacturing a multistrand cable of 1×N structure comprising a single layer of N strands wound in a helix, each strand comprising:
  an internal layer of M internal threads wound in a helix,
  an external layer of P external threads wound in a helix around the internal layer, the method comprising:
  a step of individually assembling each of the N strands by twisting, during which, and in chronological order:
    the M internal threads are wound in a helix to form the internal layer,
    the P external threads are wound in a helix around the internal layer, and
    the M internal threads and the P external threads are elongated such that the structural elongation associated with the P external threads of each strand is greater than or equal to 0.05%,
  a step of collectively assembling the N strands by twisting, during which the N strands are wound in a helix to form the cable.

By virtue of the method according to the invention, the cable does not have or virtually does not have any radial emergence of internal threads between the external threads. Specifically, the inventors originating the invention have shown that, during the step of collectively assembling the N strands, during which the N strands are wound in a helix to form the cable, the internal threads are radially compressed, within each strand, by the P external threads. This compression, generated by shortening of the pitch of the external threads that is greater than the shortening of the pitch of the internal threads during the step of collectively assembling the N strands, had the effect, in the prior art, of causing the internal threads to emerge radially between the external threads.

The inventors originating the invention have discovered that, by elongating the P external threads so as to have a relatively great structural elongation associated with these P external threads, that is to say one greater than or equal to 0.05%, the P external threads were spaced apart sufficiently to avoid compression of the M internal threads during the step of collectively assembling the N strands. Specifically, the spacing apart of the P external threads makes it possible to give a sufficient length to the external threads, making it possible, during the step of collectively assembling the N strands, to ensure that, even if the shortening of the pitches is different between the internal and external layers, the internal threads are not compressed by the external threads.

The structural elongations Asm and Asp associated with the M internal threads and P external threads, respectively, are determined and defined as follows. A force-elongation curve of a strand is realized in accordance with the standard ISO 6892-1, October 2009. The curve obtained comprises three parts that follow one another in this order, on moving towards increasing elongations. The first part corresponds to the moving of the M internal threads towards one another. The second part corresponds to the moving of the P external threads towards one another. The third part corresponds to the elastic elongation of the M internal threads and P external threads. For each of these parts, the tangent to this part is drawn. The tangent to the first part intersects the abscissa axis at a point Asi corresponding to the structural elongation associated with the spacing apart of the M internal threads. The tangent to the second part intersects the abscissa axis at a point Ase, the difference Asm=Ase-Asi corresponding to the structural elongation Asm associated with the spacing apart of the M internal threads. The tangent to the third part intersects the abscissa axis at a point As corresponding to the structural elongation of the strand, the difference Asp=As-Ase corresponding to the structural elongation Asp associated with the spacing apart of the P external threads.

Advantageously, the structural elongation of each strand associated with the P external threads is greater than or equal to 0.07%, preferably greater than or equal to 0.09%. In one advantageous embodiment, the structural elongation of each strand associated with the P external threads is greater than or equal to 0.15%, or greater than or equal to 0.20%, preferably greater than or equal to 0.25%. The greater the structural elongation associated with the P external threads, the greater the spacing apart of the P external threads at the end of the step of individually assembling each strand, and the less the M internal threads are compressed.

Advantageously, the structural elongation of each strand is greater than or equal to 0.10%, preferably greater than or equal to 0.15%, and more preferably greater than or equal to 0.20%. In one advantageous embodiment, the structural elongation of each strand is greater than or equal to 0.25%, preferably greater than or equal to 0.30%, and more preferably greater than or equal to 0.35%.

Preferably, during the step of individually assembling each strand, the M internal threads and the P external threads are elongated such that each P external thread has an elongation length greater than an elongation length of each M internal thread. The elongation length is the difference between the length of each thread after and before the step of elongating the thread.

According to one preferred embodiment, the M internal threads and the P external threads are elongated by applying an additional twist to each strand after the P external threads have been wound in a helix around the internal layer.

The additional twist is the twist applied to each strand after the step of winding the P external threads. Thus, after this additional twist, each strand has a final twist equal to the sum of the initial twist applied by the assembling of the internal and external layers and the additional twist.

Preferably, the additional twist is applied to each strand by means of a member that is mounted so as to rotate about an axis of rotation substantially parallel to the direction in which each strand passes through the member.

More preferably, the member that is mounted so as to rotate comprises at least one pulley, around at least a part of which each strand is made to pass.

Even more preferably, the member that is mounted so as to rotate comprises at least two pulleys, each strand following, in the member, a path that defines at least one loop around at least one of the pulleys.

In one advantageous embodiment, during the step of individually assembling each of the N strands:
 a tensile force is applied to the internal layer and
 a tensile force is applied to the external layer, the tensile force applied to the internal layer being greater than or equal to the tensile force applied to the external layer.

The tensile forces applied to the internal and external layers make it possible to elastically deform each internal and external thread. Thus, during the step of individually assembling each of the N strands, the internal threads are moved towards one another so as to make the internal layer even more compact. In this way, the aeration of the internal layer is reduced. The reduction in instances of radial emergence of the internal threads between the external threads is thus promoted.

In one preferred embodiment, during the step of collectively assembling the N strands:
 the N strands are wound in a helix at a pitch $p3$,
 the N strands are overtwisted so as to obtain a temporary pitch $p3'<p3$,
 the N strands are untwisted to the pitch $p3$ so as to obtain a residual torque of substantially zero.

Thus, during the step of overtwisting, the pitch of the assembly is reduced so as to plastically deform the threads of each of the N strands. This plastic deformation is retained during the following step of untwisting, this giving the cable an aeration that promotes the penetrability of the cable with the rubber. The residual torque of substantially zero corresponds to the fact that the cable is torsionally balanced so as to be able to be used in the subsequent steps using the cable. The torque is expressed in turns per metre and corresponds to the number of turns that a cable of predetermined length can make about its main axis when it is left free to move.

In one embodiment, during the step of individually assembling each of the N strands, the M internal threads and the P external threads are wound at intermediate pitches $p1'$ and $p2'$, respectively, and during the step of collectively assembling the N strands, the N strands are wound at a pitch $p3$ such that the M internal threads and the P external threads have final pitches $p1$ and $p2$, respectively, satisfying $p2/p2'<p1/p1'$, preferably $1.3 \cdot p2/p2' < p1/p1'$.

The method according to the invention is particularly advantageous in this embodiment, in which the pitch of the P external threads is even shorter than the pitch of the M internal threads during the step of collective assembly, during which the M internal threads are likely to be highly compressed if the method according to the invention is not implemented.

A further subject of the invention is a strand comprising:

an internal layer of M internal threads wound in a helix,
 an external layer of P external threads wound in a helix around the internal layer,
wherein, in said strand, the structural elongation associated with the P external threads is greater than or equal to 0.05%.

A further subject of the invention is a multistrand cable of 1×N structure that is able to be obtained by a method as described above.

As described above, the cable according to the invention does not have or virtually does not have any radial emergence of internal threads in each strand. The expression "does not have or virtually does not have radial emergence" means that each strand comprises at most 10 instances of radial emergence of internal threads per metre of strand, preferably at most 5 instances of radial emergence of internal threads per metre of strand, and more preferably 2 instances of radial emergence of internal threads per metre of strand.

A radial emergence of an internal thread corresponds to an internal thread extending radially at least in part radially on the outside of the theoretical circle in which the internal threads should be inscribed. Thus, a radial emergence can occur when an internal thread is partly or entirely interposed in the external layer. A radial emergence can also occur when an internal thread extends at least in part on the outside of the theoretical circle in which the external threads are inscribed.

Advantageously, $N=3$ or $N=4$, and preferably $N=4$.
Advantageously, $M=3$, 4 or 5, and preferably $M=3$.
Advantageously, $P=7$, 8, 9, 10 or 11, and preferably $P=8$.

Preferably, the external layer of each strand is not compact.

By definition a layer that is not compact is such that there are spaces between the threads of the layer.

Preferably, the external layer of each strand is unsaturated.

By definition, an unsaturated layer of threads is such that there is sufficient room in this layer to add at least one (X+1)th thread having the same diameter as the X threads of the layer thereto, it thus being possible for a plurality of threads to be in contact with one another. Conversely, this layer is referred to as saturated if there is not enough room in this layer to add at least one (X+1)th thread having the same diameter as the N threads of the layer thereto.

Thus, the cable according to the invention is particularly advantageous since it does not have instances of radial emergence of internal threads even though, since the external layer is unsaturated, these would be facilitated, in contrast to a cable in which the external layer of each strand is saturated. The unsaturated external layer therefore makes it possible to obtain both excellent penetrability of the rubber in each strand without the latter exhibiting any or virtually any radial emergence of internal threads.

Advantageously, with the M internal threads being wound in a helix at the pitch p1, p1 ranges from 3 to 11 mm, preferably from 5 to 9 mm.

Advantageously, with the P external threads being wound in a helix at the pitch p2, p2 ranges from 6 to 14 mm, preferably from 8 to 12 mm.

Advantageously, with the N strands being wound in a helix at the pitch p3, p3 ranges from 10 to 30 mm, preferably from 15 to 25 mm.

The values of the pitches p1, p2 and p3 can be adapted by a person skilled in the art in order to obtain the characteristics desired for the cable.

Preferably, the diameter of the internal and/or external threads ranges from 0.12 mm to 0.50 mm, preferably from 0.25 mm to 0.45 mm, and more preferably from 0.30 to 0.40 mm.

In one embodiment, each strand is made up of the internal layer and of the external layer. Thus, each strand is of the two-layer type.

A further subject of the invention is a tire for a civil engineering vehicle comprising a multistrand cable as described above.

Preferably, the tire comprises a tread and a crown reinforcement arranged radially on the inside of the tread, the crown reinforcement comprising:

a protective reinforcement comprising at least reinforcing element known as a protective reinforcing element, comprising a multistrand cable as described above; and a working reinforcement arranged radially on the inside of the protective reinforcement.

In one embodiment, the protective reinforcement is interposed radially between the tread and the working reinforcement.

Advantageously, with the protective reinforcement comprising at least one protective ply comprising the one or more protective reinforcing elements, the one or more protective reinforcing elements make an angle at least equal to 10°, preferably in the range from 10° to 35° and more preferably from 15° to 30°, with the circumferential direction of the tire.

In one embodiment, with each working reinforcement comprising at least one working ply comprising reinforcing elements known as working reinforcing elements, the working reinforcing elements make an angle at most equal to 60°, preferably in the range from 15° to 40°, with the circumferential direction of the tire.

Advantageously, the crown reinforcement comprises a hoop reinforcement comprising at least one hooping ply.

In one embodiment, with each hooping ply comprising reinforcing elements known as hoop reinforcing elements, the hoop reinforcing elements make an angle at most equal to 10°, preferably in the range from 5° to 10°, with the circumferential direction of the tire.

Preferably, the hoop reinforcement is arranged radially on the inside of the working reinforcement.

Advantageously, with the tire comprising a carcass reinforcement comprising at least one carcass ply comprising reinforcing elements known as carcass reinforcing elements, the carcass reinforcing elements make an angle greater than or equal to 65°, preferably greater than or equal to 80°, with respect to the circumferential direction of the tire.

In one embodiment, the tire has a size of the W R U type, where U≥35, preferably U≥49 and more preferably U≥57. This designation of the size of the tire is in accordance with the nomenclature of the ETRTO ("European Tire and Rim Technical Organisation").

A thread is understood to be a monofilament. When it is made of metal, the thread is a metal monofilament comprising a core made up predominantly (that is to say more than 50% of its mass) or entirely (100% of its mass) of a metallic material, for example carbon steel, optionally coated with a metal layer comprising zinc, copper, tin and alloys of these metals, for example a metal layer of brass. Preferably, the M internal threads and the P external threads are metallic. Each thread is preferentially made of steel, more preferentially pearlitic (or ferritic-pearlitic) carbon steel, or else made of stainless steel (by definition steel comprising at least 11% chromium and at least 50% iron).

When a carbon steel is used, its carbon content (% by weight of steel) is preferably between 0.5% and 0.9%. Use is preferably made of a steel of the normal tensile (NT) or high tensile (HT) steel cable type, the tensile strength (Rm) of which is preferably greater than 2000 MPa, more preferentially greater than 2500 MPa and less than 3000 MPa (measurement carried out under traction according to standard ISO 6892-1, 2009). Use could be made of ultra high tensile (UHT) or mega tensile (MT) steels. Such steels are described in the document EP2433814.

In the present application, any range of values denoted by the expression "between a and b" represents the range of values from more than a to less than b (that is to say excluding the end points a and b), whereas any range of values denoted by the expression "from a to b" means the range of values from the end point "a" as far as the end point "b", namely including the strict end points "a" and "b".

BRIEF DESCRIPTION OF THE DRAWINGS

The invention will be better understood from reading the following description, which is given solely by way of non-limiting example and with reference to the drawings in which.

DETAILED DESCRIPTION OF EMBODIMENTS OF THE INVENTION

Example of Tires and Cables According to the Invention

A frame of reference X, Y, Z corresponding to the usual axial, radial and circumferential orientations, respectively, of a tire has been depicted in the figures.

Figure 1:
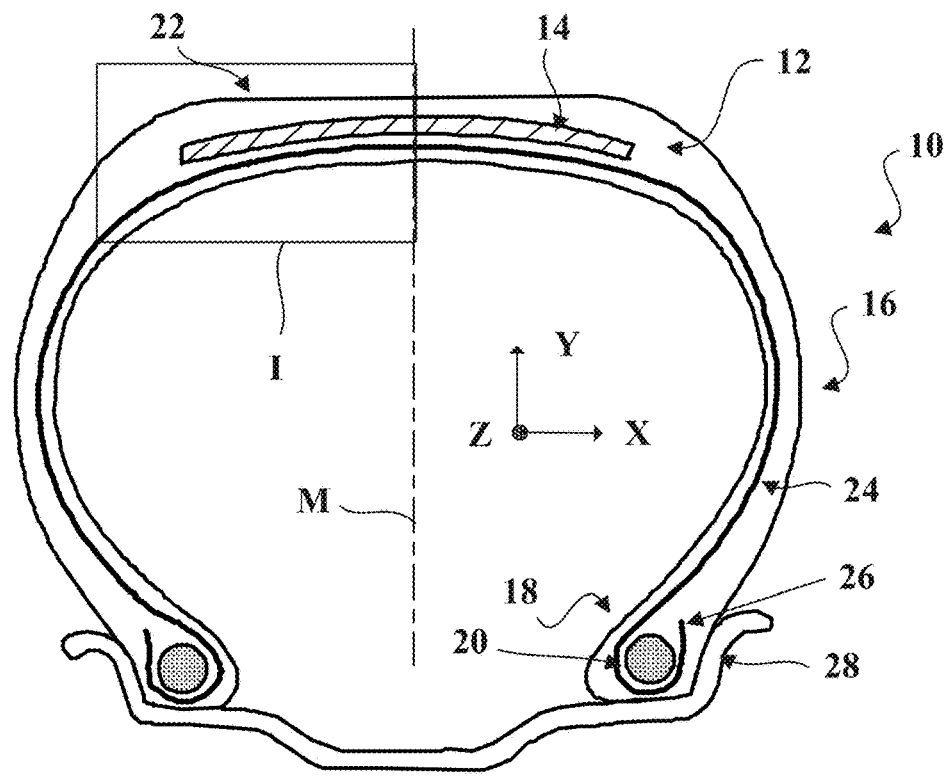
FIG. 1 is a simplified view in section of a tire according to the invention.
Figure 2:
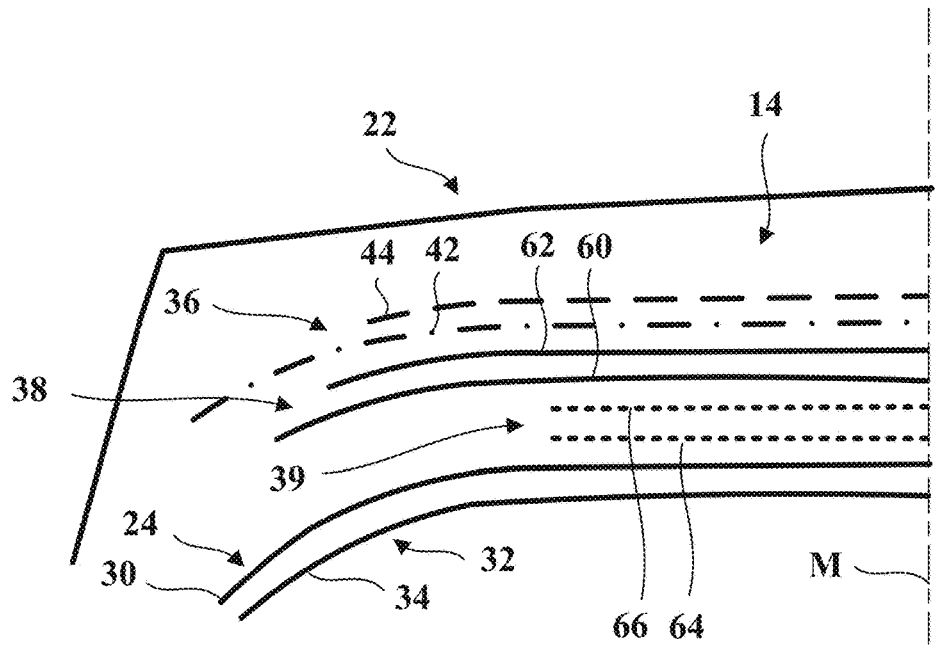
FIG. 2 is a detail view of the part I of the tire in FIG. 1.

FIGS. 1 and 2 show a tire for a civil engineering-type vehicle, for example of the "dumper" type, denoted by the overall reference 10. Thus, the tire 10 has a size of the W R U type, for example 40.00 R 57 or 59/80 R 63.

In a manner known to a person skilled in the art, W:
when it is in the form H/B, denotes the nominal aspect ratio H/B as defined by the ETRTO (H being the height of the section of the tire and B being the width of the section of the tire) and,
when it is in the form H.00 or B.00, in which H=B, H and B being as defined above. U represents the diameter, in inches, of the rim seat on which the tire is intended to be mounted, and R denotes the type of carcass reinforcement of the tire, in this case radial. U≥35, preferably U≥49 and more preferably U≥57.

The tire 10 has a crown 12 reinforced by a crown reinforcement 14, two sidewalls 16 and two beads 18, each of these beads 18 being reinforced with a bead wire 20. The crown 12 is surmounted by a tread 22. The crown reinforcement 14 is arranged radially on the inside of the tread 22. A carcass reinforcement 24, arranged radially on the inside of the crown reinforcement 14, is anchored in each bead 18, in this case wrapped around each bead wire 20 and comprises a turn-up 26 disposed towards the outside of the tire 10, which is shown mounted on a rim 28 here.

The carcass reinforcement 24 comprises at least one carcass ply 30 comprising reinforcing elements known as carcass reinforcing elements (not shown). The carcass reinforcing elements make an angle greater than or equal to 65°, preferably greater than or equal to 80°, with respect to the circumferential direction Z of the tire 10. Examples of such carcass reinforcing elements are described in the documents EP0602733 and also EP0383716.

The tire 10 also comprises a sealing ply 32 made up of an elastomer, for example of butyl, (commonly known as "inner liner") which defines the radially internal face 34 of the tire 10 and which is intended to protect the carcass ply 30 from the diffusion of air coming from the space inside the tire 10.

The crown reinforcement 14 comprises, radially from the outside to the inside of the tire 10, a protective reinforcement 36 arranged radially on the inside of the tread 22, a working reinforcement 38 arranged radially on the inside of the protective reinforcement 36 and a hoop reinforcement 39 arranged radially on the inside of the working reinforcement 38. Thus, the protective reinforcement 36 is interposed radially between the tread 22 and the working reinforcement 38.

The protective reinforcement 36 comprises first and second protective plies 42, 44, the first protective ply 42 being arranged radially on the inside of the second protective ply 44. The first and second protective plies 42, 44 comprise reinforcing elements known as protective reinforcing elements (not shown).

The protective reinforcing elements are arranged side by side parallel to one another in a main direction substantially perpendicular to the overall direction in which these reinforcing elements extend. The protective reinforcing elements are crossed from one protective ply 42, 44 to the other. Each protective reinforcing element, in this case the overall direction in which these reinforcing elements extend, makes an angle at least equal to 10°, preferably in the range from 10° to 35° and more preferably from 15° to 30°, with the circumferential direction Z of the tire 10. In this case, the angle is equal to 24°.

Figure 3:
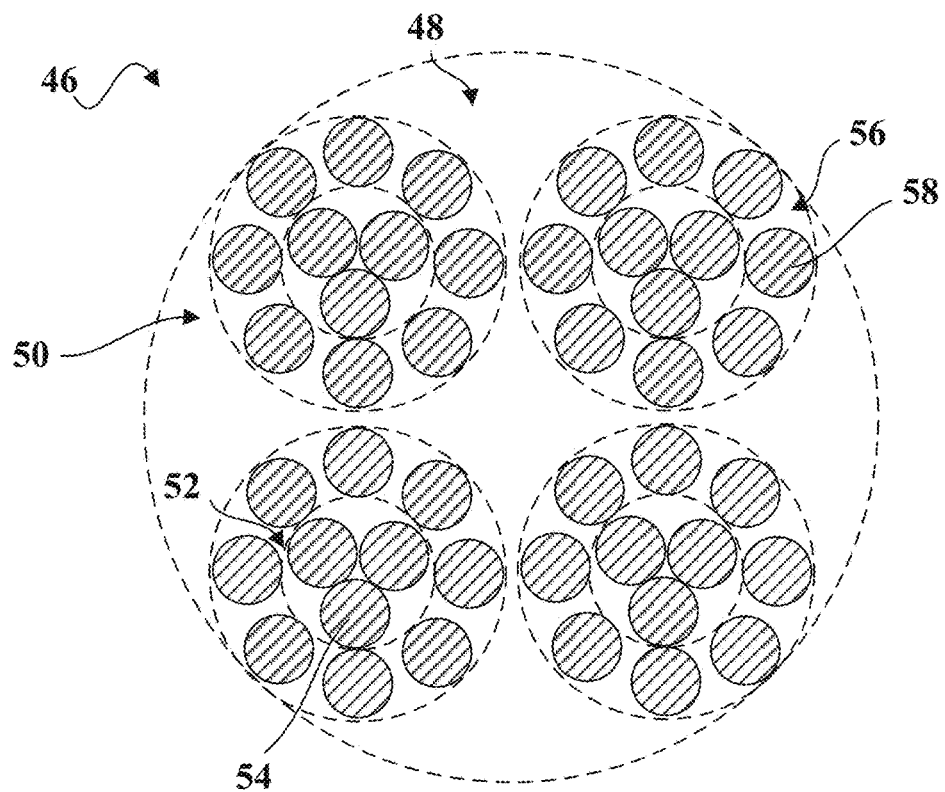
FIG. 3 is a schematic view in section perpendicular to the axis of the cable (which is assumed to be straight and at rest) of a cable according to a first embodiment of the invention.

With reference to FIG. 3, each protective reinforcing element comprises a multistrand cable 46 of 1×N structure. The cable 46 comprises a single layer 48 of N strands 50 wound in a helix at a pitch p3. The N strands 50 are wound in a Z or S direction.

Each strand 50 comprises an internal layer 52 of M internal threads 54 wound in a helix at a pitch p1 and an external layer 56 of P external threads 58 wound in a helix around the internal layer 52 at a pitch p2. In this case, each strand 50 is made up of the internal layer 52 and of the external layer 56. Each strand 50 therefore has no wrapping wire.

Each internal thread 54 and external thread 58 has a diameter ranging from 0.12 mm to 0.50 mm, preferably from 0.25 mm to 0.45 mm, and more preferably from 0.30 to 0.40 mm and in this case equal to 0.35 mm. Each internal thread 54 and external thread 58 is metallic, in this case made of HT ("High Tensile") grade steel having a breaking strength equal to 2765 MPa. Other grades of steel can of course be used. In further embodiments, the diameter of the internal threads 54 can be different from the diameter of the external threads 58.

The external layer 56 of each strand 50 is not compact and unsaturated.

The winding pitch p1 of the M internal threads 54 ranges from 3 to 11 mm, preferably from 5 to 9 mm and in this case is equal to 6.7 mm. The winding pitch p2 of the P external threads 58 ranges from 6 to 14 mm, preferably from 8 to 12 mm and in this case is equal to 10 mm. Finally, the winding pitch p3 of the N strands 50 ranges from 10 to 30 mm, preferably from 15 to 25 mm and in this case is equal to 20 mm.

The internal threads 54, the external threads 58 and the N strands are wound in the same direction, Z or S.

In the first embodiment illustrated in FIG. 3, N=3 or N=4, and in this case N=4. Also, M=3, 4 or 5 and in this case M=3. Finally, P=7, 8, 9, 10 or 11 and in this case P=8.

Figure 4:
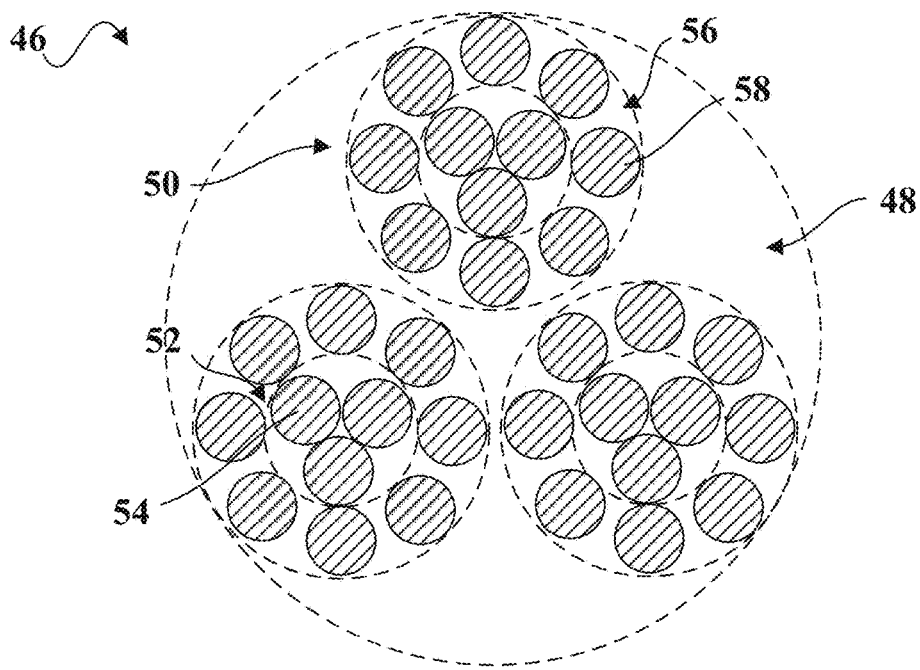
FIG. 4 is a schematic view in section perpendicular to the axis of the cable (which is assumed to be straight and at rest) of a cable according to a second embodiment of the invention.

In the second embodiment of the cable 46 illustrated in FIGS. 4, N=3, M=3 and P=8.

Returning to FIG. 2, the working reinforcement 38 comprises first and second working plies 60, 62, the first working ply 60 being arranged radially on the inside of the second working ply 62. The first and second working plies 60, 62 comprise reinforcing elements known as working reinforcing elements (not shown).

The working reinforcing elements are arranged side by side parallel to one another in a main direction substantially perpendicular to the overall direction in which these reinforcing elements extend. The working reinforcing elements are crossed from one working ply 60, 62 to the other. Each working reinforcing element, in this case the overall direction in which these reinforcing elements extend, makes an angle at most equal to 60°, preferably in the range from 15° to 40°, with the circumferential direction Z of the tire 10. In this case, the angle of the reinforcing elements of the first working ply is equal to 19° and the angle of the reinforcing elements of the second working ply is equal to 33°.

Examples of such working reinforcing elements are described in the documents EP0602733 and also EP0383716.

The hoop reinforcement 39, also known as limiting block, the function of which is to partially absorb the mechanical stresses due to inflation, comprises first and second hooping plies 64, 66, the first hooping ply 64 being arranged radially on the inside of the second hooping ply 66.

Each hooping ply 64, 66 comprises metal hoop reinforcing elements (not shown), for example metal cables, as described in FR 2 419 181 or FR 2 419 182, that make an angle at most equal to 10°, preferably in the range from 5° to 10°, with the circumferential direction Z of the tire 10. In this case, the angle is equal to 8°. The hoop reinforcing elements are crossed from one hooping ply 64, 66 to the other.

Figure 5:
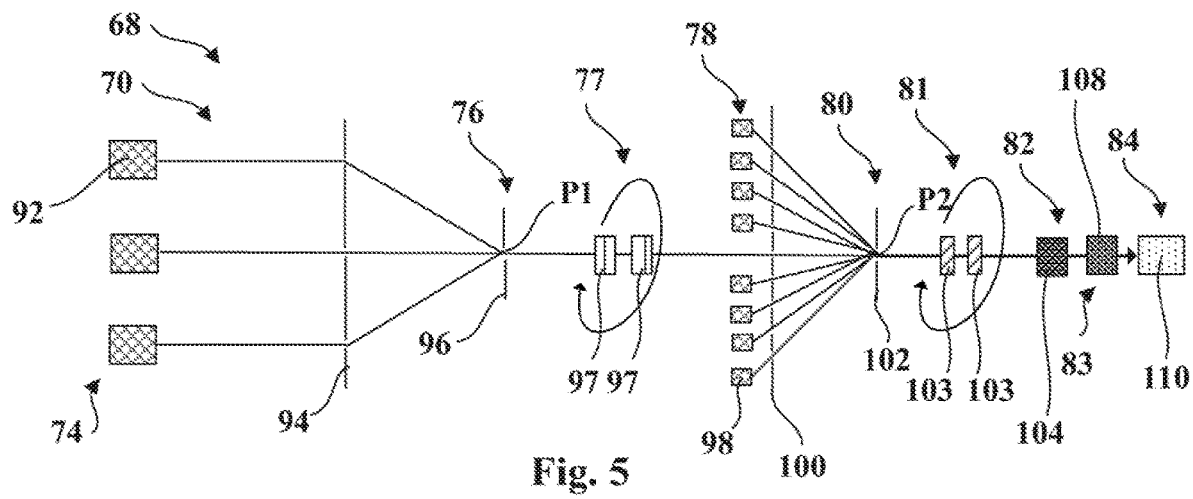
FIGS. 5 and 6 are schematic views of an installation for implementing the method according to the invention.
Figure 6:
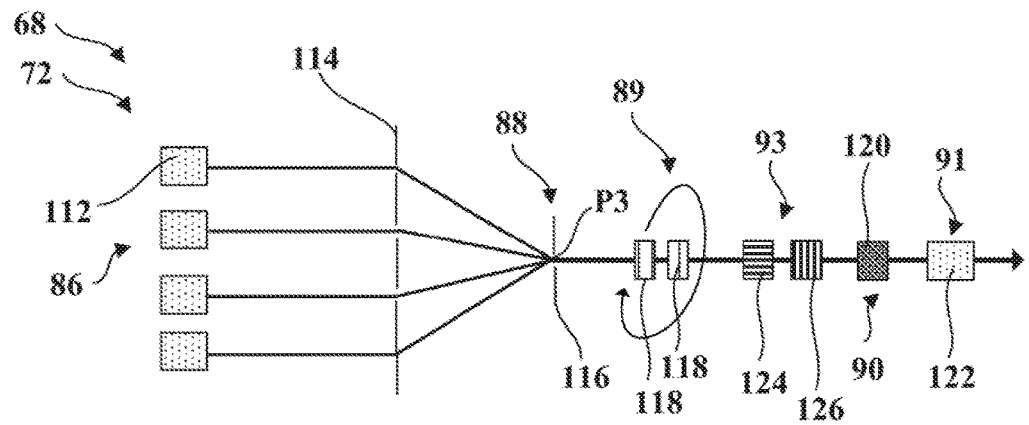
Figure 7:
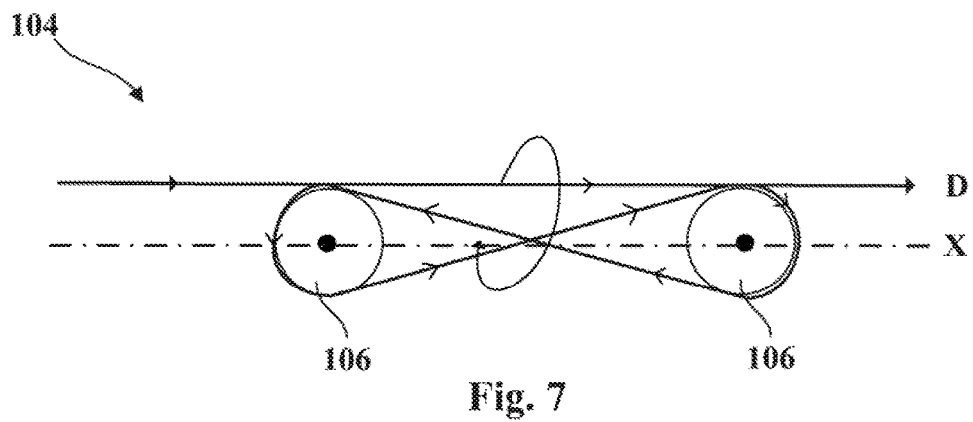
FIG. 7 is a schematic view of an element of the installation in FIG. 5.

Example of a Method for Manufacturing a Multistrand Cable According to the Invention FIGS. 5, 6 and 7 illustrate an installation 68 for manufacturing the cable 46 as described above.

The installation 68 comprises an installation 70 for manufacturing each strand 50, shown in FIG. 5, and an installation 72 for assembling the strands 50, shown in FIG. 6.

It will be recalled that there are two possible techniques for assembling metal threads:
   Either by cabling: in which case the threads undergo no twisting about their own axis, on account of a synchronous rotation before and after the assembling point;
   Or by twisting: in which case the threads undergo both a collective twist and an individual twist about their own axis, thereby generating an untwisting torque on each of the threads and on the strand or the cable itself.

In accordance with the invention, the method according to the invention uses twisting and not cabling.

The installation 70 for manufacturing each strand 50 comprises, from upstream to downstream in the direction in which the strand 50 passes, means 74 for feeding the M internal threads 54, means 76 for assembling the M internal threads 54 by twisting, means 77 for setting the assembled M internal threads in rotation, means 78 for feeding the P external threads 58, means 80 for assembling the P external threads 58 around the internal layer 52 by twisting, means 81 for setting each strand 50 in rotation, means 82 for elongating the M internal threads and the P external threads, means 83 for tensioning the strand 50 and means 84 for storing the strand 50.

The assembly 72 for assembling the strands 50 comprises, from upstream to downstream in the direction in which the cable 46 passes, means 86 for feeding the N strands 50, means 88 for assembling the N strands 50 together by twisting, means 89 for setting the cable 46 in rotation, means 93 for aerating and balancing the cable, means 90 for tensioning the cable 46 and means 91 for storing the cable 46.

With reference to FIG. 5, the means 74 for feeding the M internal threads 54 comprise reels 92 for unwinding each internal thread 54. The means 76 for assembling the M internal threads comprise a distributor 94 and an assembly guide 96 defining an assembly point P1. The means for setting in rotation 77 comprise two flywheels 97 arranged downstream of the assembly point P1. A rotary feed is thus spoken of.

The means 78 for feeding the P external threads 58 comprise reels 98 for unwinding each external thread 58. The means 80 for assembling the P external threads comprise a distributor 100 and an assembly guide 102 defining an assembly point P2. The means for setting in rotation 81 comprise two flywheels 103 arranged downstream of the assembly point P2. Rotary reception is thus spoken of.

With reference to FIG. 7, the means 82 for elongating the M internal threads and the P external threads comprise a member 104 that is mounted so as to rotate about an axis of rotation X substantially parallel to the direction D in which each strand 50 passes through the member 104. The member 104 that is mounted so as to rotate comprises at least one pulley 106, around at least a part of which each strand 50 is made to pass. In the present case, the member 104 that is mounted so as to rotate comprises several pulleys, in this case two pulleys 106. In the member 104, each strand 50 follows a path defining at least one loop around at least one of the pulleys 106. In this case, each strand follows a path defining an "8" on its side and is wrapped around each pulley 106. In this case, the member 104 is a two-pulley twister.

The means 83 for tensioning each strand 50 comprise one or more winches 108 and the means 84 for storing each strand 50 comprise a reel 110 for winding each strand 50.

Each strand 50 is in this case assembled by twisting.

With reference to FIG. 6, the means 86 for feeding the N strands 50 comprise reels 112 for unwinding each strand 50. The means 88 for assembling the N strands 50 together comprise a distributor 114 and an assembly guide 116 defining an assembly point P3. The means 89 for setting the cable 46 in rotation comprise two flywheels 118 arranged downstream of the assembly point P3. The aerating and balancing means 93 comprise an upstream twister 124 and a downstream twister 126. The means 90 for tensioning the cable 46 comprise one or more winches 120 and the means 91 for storing the cable 46 comprise a reel 122 for winding the cable 46.

A method for manufacturing the cable 46 that is implemented by means of the installation 68 described above will now be described.

The method comprises two steps of assembling by twisting. The first step is a step of individually assembling each of the N strands 50 by twisting that is implemented by the installation means 70. The second step is a step of collectively assembling the N strands 50 by twisting that is implemented by the installation means 72.

During the first step of individually assembling by twisting, the M internal threads 54 are wound in a helix, at an intermediate pitch p1', in order to form the internal layer 52. In this case, p1'=10 mm.

Then, still in this first step of individually assembling by twisting, the P external threads 58 are wound in a helix, at an intermediate pitch p2', around the internal layer 52. In this case, p2'=20 mm.

Next, still in this first step of individually assembling, the M internal threads 54 and the P external threads 58 are elongated such that each P external thread 58 has an elongation length greater than an elongation length of each M internal thread 54. The M internal threads 54 and the P external threads 58 are elongated by plastic deformation by means of the means 82. In the present case, the M internal threads 54 and the P external threads 58 are elongated by plastic deformation by applying an additional twist to each strand 50 after the P external threads 58 have been wound in a helix around the internal layer 52. Then, each strand 50 that is thus obtained is stored on the storage means 84. The additional twist is applied by regulating the value of the speed of rotation of the rotating member 104 about the axis X. A person skilled in the art will know how to find the value of this speed of rotation depending on the desired lengths of elongation.

During the step of individually assembling each of the N strands 50, a tensile force T1 is applied to the internal layer 52. During this step of individually assembling each of the N strands 50, a tensile force T2 is also applied to the external layer 56. The tensile force T1 applied to the internal layer 52 is greater than the tensile force T2 applied to the external layer 56.

During the second step of collectively assembling the N strands 50, N strands 50 are wound in a helix, at the pitch p3, to form the cable at the pitch p3, as illustrated in FIG. 6. To this end, during the step of collectively assembling the N strands 50, the N strands 50 are first of all wound in a helix at the pitch p3. Then, by means of the upstream twister 124, the N strands 50 are overtwisted so as to obtain a temporary pitch p3'<p3. Next, the N strands 50 are untwisted to the pitch p3 so as to obtain a residual torque of substantially zero by means of the downstream twister 126.

During this second step of collectively assembling the N strands 50, the N strands are wound at the pitch p3 such that the M internal threads 54 and the P external threads 58 have final pitches p1 and p2, respectively, satisfying p2/p2'<p1/p1', preferably 1.3·p2/p2'<p1/p1'. In this case, p1=6.7 mm and p2=10 mm Comparative Tests A prior art cable C0 and three cables 46, 47 and 49 according to the invention were compared in the following text. The characteristics of these cables C0, 46 and 47 are compiled in Table 1 below.

The cable C0 was manufactured using a method in accordance with the prior art, that is to say without a step of elongating the M internal threads and the P external threads. The prior art method is associated with the reference "1".

The cables 46, 47 and 49 according to the invention were manufactured by implementing a method according to the invention. Each cord 46 and 49 is obtained by implementing the above-described method according to the invention, which is associated with the reference "2", wherein, during the step of individually assembling each of the N strands, a tensile force is applied to the internal layer that is greater than the tensile force applied to the external layer. The cord 47 is obtained by implementing a method according to the invention, which is associated with the reference "3", wherein, during the step of individually assembling each of the N strands, the same tensile force is applied to the internal layer and to the external layer.

Each cord tested has the following final pitches p1, p2 and p3: p1=6.7 mm, p2=10 mm and p3=20 mm.

Force at break, denoted Fm (maximum load in N), is measured under tension in accordance with standard ISO 6892-1, October 2009, on cables directly produced by the manufacturing method.

The number of instances of emergence of internal threads per metre of strand Ns is measured by disassembling the cable tested and counting, for each strand, the number of instances of emergence of internal threads. Thus, for N strands, a total number of instances of emergence of internal threads per metre of cable is obtained. By dividing this total number by N, the number Ns of instances of emergence of internal threads per metre of strand is obtained.

The number of instances of bowing of internal threads that is observed per meter of strand Nf is also measured in a similar manner. Bowing corresponds to an abnormally large curvature of a thread without this otherwise constituting a radial emergence.

Since they do not have or virtually do not have instances of emergence of internal threads, the cables 46, 47 and 49 do not have a variable diameter. Thus, all the problems linked to this variation in the diameter of the cable are avoided, thereby making it less tedious to manufacture and reducing its cost.

On comparing the cables 46 (method 2) and 47 (method 3), it will be noted that applying, during the step of individually assembling each of the N strands (cable 46, method 2), a tensile force to the internal layer that is greater than the tensile force applied to the external layer makes it possible to reduce even further the number of instances of bowing Nf of internal threads compared with a method comprising an assembly step during which the tensile force applied to the internal layer is equal to the tensile force applied to the external layer (cable 47, method 3). The fact that the cable 49 (method 2) has a number of instances of bowing Nf equal to that of the cable 47 (method 3) is linked to the fact that the associated structural elongation Asp associated with the P external threads of the cable 49 is less than that of the cable 47, this favouring the occurrence of instances of bowing compared with the cable 47.

Figure 8:
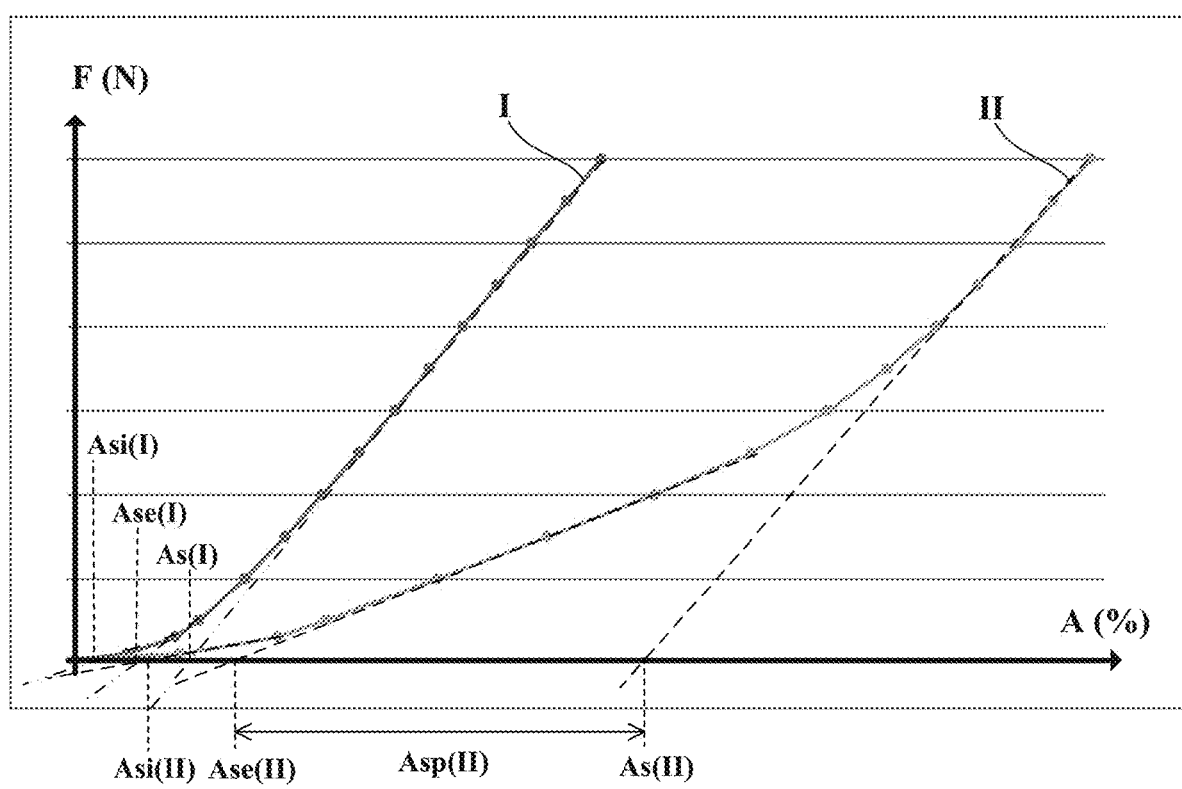
FIG. 8 is a graph illustrating force-elongation curves for a strand of one of the cables according to the invention in FIGS. 3 and 4 and of a prior art strand.

FIG. 8 shows the force-elongation curve I of a strand (3+8)×0.35 of the cable C0 and the force-elongation curve II of a strand of the cable 46. Each of these curves represents the variation in the elongation A (in %, on the abscissa) depending on the force F (in newtons, on the ordinate) applied thereto. This force-elongation curve is obtained under experimental conditions in accordance with the standard ISO 6892-1, October 2009.

It will be noted that each curve comprises three parts. The first part corresponds to the moving of the M internal threads towards one another. The second part corresponds to the moving of the P external threads towards one another. The third part corresponds to the elastic elongation of the M internal threads and P external threads. For each of the parts, the tangent to this part has been drawn. Thus, the tangent to the first part intersects the abscissa axis at a point Asi corresponding to the structural elongation associated with the spacing apart of the M internal threads. The tangent to the second part intersects the abscissa axis at a point Ase, the difference Ase-Asi corresponding to the structural elongation Asm associated with the spacing apart of the M internal threads. The tangent to the third part intersects the abscissa axis at a point As, the difference As-Ase corresponding to the structural elongation Asp associated with the spacing apart of the P external threads.

It will be noted that the spacing apart of the P external threads of the strand of curve II makes it possible to obtain a strand having much greater structural elongation associated with the P external threads than the strand of curve I. Specifically, the structural elongation Asp associated with the P external threads of the strand of curve II is greater than or equal to 0.05%, or even greater than or equal to 0.07%, preferably greater than or equal to 0.09%. In the present case, the structural elongation Asp associated with the P external threads of the strand of curve II is greater than or equal to 0.15%, or even greater than or equal to 0.20%, preferably greater than or equal to 0.25%. In this case, Asp=0.31%.

It will also be noted that the structural elongation As of the strand of curve II is much greater than the structural elongation of the strand of curve I. Specifically, the elongation As of the strand of curve II is greater than or equal to 0.10%, preferably greater than or equal to 0.15% and more preferably greater than or equal to 0.20%. In the present case, the elongation As of the strand of curve II is greater than or equal to 0.25%, preferably greater than or equal to 0.30% and more preferably greater than or equal to 0.35%. In this case, As=0.43%.

Moreover, it is noted that, with an identical structure, the cables 46, 47 and 49 allow a minimum increase of 5% in force at break compared with the cable C0. A posteriori, the inventors originating the invention have discovered that, on the one hand, in the cable C0, the internal threads emerging between the external threads rubbed between the latter, resulting in a drop in the force at break of the cable. On the other hand, the inventors hypothesize, a posteriori, that since the M internal threads do not have any excess length in the cable according to the invention, said M internal threads contribute, when the cable is tensioned, to the mechanical strength of the cable at the same time as the P external threads. By contrast, in the prior art cable, the M internal threads have an excess length, these M internal threads not being involved, when the cable is tensioned, in the mechanical strength of the cable at the same time as the P external threads, this reducing the force at break of the prior art cable compared with the cable of the invention.

TABLE 1

| Cable | Structure | Method | Steel grade | Fm N | Ase % | As % | Asp % | Ns $m^{-1}$ | Nf $m^{-1}$ |
|---|---|---|---|---|---|---|---|---|---|
| C0 | 4 × (3 + 8) × 0.35 | 1 | HT | 9173 | 0.05 | 0.09 | 0.04 | 20 | >20 |
| 46 | 4 × (3 + 8) × 0.35 | 2 | HT | 9612 | 0.12 | 0.43 | 0.31 | 0 | 2 |
| 47 | 4 × (3 + 8) × 0.35 | 3 | HT | 9495 | 0.24 | 0.35 | 0.11 | 0 | 4 |
| 49 | 4 × (3 + 8) × 0.35 | 2 | HT | 9450 | 0.11 | 0.20 | 0.09 | 0 | 4 |

The invention is not limited to the embodiments described above.

Specifically, each strand could also comprise an intermediate layer, interposed between the internal layer and the external layer, the threads of the intermediate layer being wound in a helix around the internal layer and the threads of the external layer being wound in a helix around the intermediate layer. In this embodiment, the cable is made up of the internal layer, of the intermediate layer and of the external layer.

The invention claimed is:

1. A method for manufacturing a multistrand cable having a 1×N structure and including a single layer of N strands wound in a helix, in which each strand includes an internal layer of M internal threads wound in a helix and an external layer of P external threads wound in a helix around the internal layer, the method comprising steps of:
   (1) individually assembling each of the N strands by twisting, during which, in chronological order: (a) the M internal threads are wound in a helix to form the internal layer, (b) the P external threads are wound in a helix around the internal layer, and (c) the M internal threads and the P external threads are elongated such that a structural elongation (Asp) associated with the P external threads of each strand is greater than or equal to 0.05%; and
   (2) collectively assembling the N strands by twisting, during which the N strands are wound in a helix to form the cable,
   wherein the M internal threads and the P external threads are elongated by applying an additional twist to each strand after the P external threads have been wound in a helix around the internal layer.

2. The method according to claim 1, wherein the structural elongation (Asp) of each strand associated with the P external threads is greater than or equal to 0.07%.

3. The method according to claim 1, wherein the structural elongation (Asp) of each strand associated with the P external threads is greater than or equal to 0.09%.

4. The method according to claim 1, wherein a structural elongation (As) of each strand is greater than or equal to 0.10%.

5. The method according to claim 1, wherein a structural elongation (As) of each strand is greater than or equal to 0.20%.

6. The method according to claim 1, wherein, during the step of individually assembling each of the N strands, the M internal threads and the P external threads are elongated such that each thread of the P external threads has an elongation length greater than an elongation length of each thread of the M internal threads.

7. The method according to Claim 1, wherein the additional twist is applied to each strand using a member that is mounted to rotate about an axis of rotation (X) substantially parallel to a direction (D) in which each strand passes through the member.

8. The method according to claim 7, wherein the member includes at least one pulley around at least a part of which each strand is made to pass.

9. The method according to claim 8, wherein the member includes at least two pulleys arranged such that each strand follows a path that defines at least one loop around at least one of the pulleys.

10. A method for manufacturing a multistrand cable having a 1×N structure and including a single layer of N strands wound in a helix, in which each strand includes an internal layer of M internal threads wound in a helix and an external layer of P external threads wound in a helix around the internal layer, the method comprising steps of:
    (1) individually assembling each of the N strands by twisting, during which, in chronological order: (a) the M internal threads are wound in a helix to form the internal layer, (b) the P external threads are wound in a helix around the internal layer, and (c) the M internal threads and the P external threads are elongated such that a structural elongation (Asp) associated with the P external threads of each strand is greater than or equal to 0.05%; and
    (2) collectively assembling the N strands by twisting, during which the N strands are wound in a helix to form the cable, wherein, during the step of individually assembling each of the N strands, a tensile force is applied to the internal layer and a tensile force is applied to the external layer, with the tensile force applied to the internal layer being greater than the tensile force applied to the external layer.

11. A method for manufacturing a multistrand cable having a 1×N structure and including a single layer of N strands wound in a helix, in which each strand includes an internal layer of M internal threads wound in a helix and an external layer of P external threads wound in a helix around the internal layer, the method comprising steps of:
(1) individually assembling each of the N strands by twisting, during which, in chronological order: (a) the M internal threads are wound in a helix to form the internal layer, (b) the P external threads are wound in a helix around the internal layer, and (c) the M internal threads and the P external threads are elongated such that a structural elongation (Asp) associated with the P external threads of each strand is greater than or equal to 0.05%; and
(2) collectively assembling the N strands by twisting, during which the N strands are wound in a helix to form the cable,
wherein, during the step of collectively assembling the N strands: (a) the N strands are wound in a helix at a pitch p3, (b) the N strands are overtwisted so as to obtain a temporary pitch p3'<p3, and (c) the N strands are untwisted to the pitch p3 so as to obtain a residual torque of substantially zero.

12. A method for manufacturing a multistrand cable having a 1×N structure and including a single layer of N strands wound in a helix, in which each strand includes an internal layer of M internal threads wound in a helix and an external layer of P external threads wound in a helix around the internal layer, the method comprising steps of:
(1) individually assembling each of the N strands by twisting, during which, in chronological order: (a) the M internal threads are wound in a helix to form the internal layer, (b) the P external threads are wound in a helix around the internal layer, and (c) the M internal threads and the P external threads are elongated such that a structural elongation (Asp) associated with the P external threads of each strand is greater than or equal to 0.05%; and
(2) collectively assembling the N strands by twisting, during which the N strands are wound in a helix to form the cable,
wherein during the step of individually assembling each of the N strands, the M internal threads and the P external threads are wound at intermediate pitches p1' and p2', respectively, and
wherein during the step of collectively assembling the N strands, the N strands are wound at a pitch p3 such that the M internal threads and the P external threads have final pitches p1 and p2, respectively, satisfying a relationship of p2/p2'<p1/p1'.

13. The method according to Claim 12, wherein a relationship of 1.3×p2/p2'<p1/p1' is satisfied.

14. A strand comprising:
an internal layer of M internal threads wound in a helix; and
an external layer of P external threads wound in a helix around the internal layer,
wherein a structural elongation (Asp) associated with the P external threads is greater than or equal to 0.05%, and
wherein, during assembling of the strand, a tensile force is applied to the internal layer and a tensile force is applied to the external layer, with the tensile force applied to the internal layer being greater than the tensile force applied to the external layer.

15. The multistrand cable manufactured by the method according to claim 1.

16. The multistrand cable according to claim 15, wherein N=3.

17. The multistrand cable according to claim 15, wherein N=4.

18. The multistrand cable according to claim 15, wherein M=3, 4, or 5.

19. The multistrand cable according to claim 15, wherein M=3.

20. The multistrand cable according to claim 15, wherein P=7, 8, 9, 10, or 11.

21. The multistrand cable according to claim 15, wherein P=8.

22. The multistrand cable according to claim 15, wherein the external layer of each strand is not compact.

23. The multistrand cable according to claim 15, wherein the M internal threads are wound in a helix at a pitch p1, with p1 being in a range of 3 mm to 11 mm.

24. The multistrand cable according to claim 15, wherein the M internal threads are wound in a helix at a pitch p1, with p1 being in a range of 5 mm to 9 mm.

25. The multistrand cable according to claim 15, wherein the P external threads are wound in a helix at a pitch p2, with p2 being in a range of 6 mm to 14 mm.

26. The multistrand cable according to claim 15, wherein the P external threads are wound in a helix at a pitch p2, with p2 being in a range of 8 mm to 12 mm.

27. The multistrand cable according to claim 15, wherein the N strands are wound in a helix at a pitch p3, with p3 being in a range of 10 mm to 30 mm.

28. The multistrand cable according to claim 15, wherein the N strands are wound in a helix at a pitch p3, with p3 being in a range of 15 mm to 25 mm.

29. A tire comprising the multistrand cable according to claim 15.

* * * * *